(12) United States Patent
Nagaraj et al.

(10) Patent No.: US 9,510,280 B2
(45) Date of Patent: Nov. 29, 2016

(54) TRANSMITTING BEACON FRAMES OVER A WIRELESS DATA LINK

(71) Applicant: Apple Inc., Cupertino, CA (US)

(72) Inventors: Suresh Nagaraj, Sunnyvale, CA (US); Songkran Vatanapanpilas, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 716 days.

(21) Appl. No.: 13/626,656

(22) Filed: Sep. 25, 2012

(65) Prior Publication Data

US 2014/0064164 A1 Mar. 6, 2014

Related U.S. Application Data

(60) Provisional application No. 61/697,454, filed on Sep. 6, 2012.

(51) Int. Cl.
| H04W 4/00 | (2009.01) |
| H04W 52/02 | (2009.01) |
| H04L 12/28 | (2006.01) |
| H04W 88/10 | (2009.01) |
| H04L 12/18 | (2006.01) |

(Continued)

(52) U.S. Cl.
CPC ........ H04W 52/0206 (2013.01); H04L 12/189 (2013.01); H04W 52/0216 (2013.01); H04W 88/08 (2013.01); H04W 88/10 (2013.01); H04W 84/12 (2013.01); Y02B 60/50 (2013.01)

(58) Field of Classification Search
CPC ........... H04W 52/02; H04W 52/0203; H04W 52/0206; H04W 72/042; H04W 72/1273; H04W 74/006; H04W 84/12; H04W 88/08; H04W 88/085; H04W 88/10; H04W 88/12; H04W 52/0216; Y02B 60/50; H04L 12/189

See application file for complete search history.

(56) References Cited

U.S. PATENT DOCUMENTS

| 7,333,460 B2* | 2/2008 | Vaisanen | H04W 48/12 370/230 |
| 7,420,942 B2* | 9/2008 | Wang | H04W 8/26 370/329 |
| 7,529,957 B2* | 5/2009 | Krantz | G06F 1/3203 713/320 |

(Continued)

FOREIGN PATENT DOCUMENTS

| EP | 2157739 | 2/2010 |
| EP | 2819480 A1 * | 12/2014 ............ H04W 74/08 |

OTHER PUBLICATIONS

Yi Xie et al. "Centralized PSM: An AP-centric power saving mode for 802.11 infrastructure networks". Sarnoff Symposium, 2009, Sarnoff '09. IEEE, Piscataway, NJ, USA. Mar. 30, 2009, pp. 1-5 XP031450949. ISBN: 978-1-4244-3381-0.

(Continued)

Primary Examiner — Alpus H Hsu
(74) Attorney, Agent, or Firm — Sterne, Kessler, Goldstein & Fox P.L.L.C.

(57) ABSTRACT

A method and apparatus are described for transmitting beacon frames from an access point to an electronic device over a wireless data link. In the described embodiments, a processing subsystem is coupled to a transceiver and is configured to determine a beacon frame interval based on a highest common factor of a listen interval for the electronic device and a delivery traffic indication message interval, and to control the transceiver to transmit a beacon frame each beacon frame interval.

25 Claims, 5 Drawing Sheets

(51) Int. Cl.
*H04W 88/08* (2009.01)
*H04W 84/12* (2009.01)

(56) References Cited

U.S. PATENT DOCUMENTS

| | | | | |
|---|---|---|---|---|
| 7,555,663 B2* | 6/2009 | Krantz | ................ | G06F 1/3203 713/300 |
| 7,593,417 B2* | 9/2009 | Wang | ................ | H04W 52/02 370/328 |
| 7,656,831 B2* | 2/2010 | Gao | ................ | H04W 52/0216 370/311 |
| 7,697,457 B2* | 4/2010 | Igarashi | ................ | H04W 72/10 370/254 |
| 7,787,437 B2* | 8/2010 | Sakoda | ................ | H04W 48/08 370/348 |
| 7,885,217 B2* | 2/2011 | Iyer | ................ | H04L 12/189 370/311 |
| 7,949,376 B2* | 5/2011 | Maekawa | ................ | H04L 12/12 370/318 |
| 8,005,032 B2* | 8/2011 | Wang | ................ | H04W 48/12 370/311 |
| 8,014,369 B2* | 9/2011 | Chou | ................ | H04W 52/343 370/338 |
| 8,102,790 B1* | 1/2012 | Trehus | ................ | H04W 52/0216 370/311 |
| 8,295,216 B2* | 10/2012 | Jokela | ................ | H04W 74/006 370/311 |
| 8,345,647 B2* | 1/2013 | Jokela | ................ | H04L 12/1881 370/217 |
| 8,446,855 B2* | 5/2013 | Igarashi | ................ | H04W 52/0216 370/320 |
| 8,576,762 B2* | 11/2013 | Thomas | ................ | H04W 52/0216 370/311 |
| 8,588,868 B2* | 11/2013 | Miyata | ................ | H04B 1/406 455/343.5 |
| 8,611,970 B2* | 12/2013 | Meylan | ................ | H04W 52/0225 370/311 |
| 8,717,959 B2* | 5/2014 | Vedantham | ................ | H04W 52/0232 370/229 |
| 8,767,601 B2* | 7/2014 | Park | ................ | H04W 52/0216 370/311 |
| 8,879,458 B2* | 11/2014 | Gupta | ................ | H04L 12/189 370/311 |
| 8,880,104 B2* | 11/2014 | Meylan et al. | ................ | 455/457 |
| 8,934,468 B2* | 1/2015 | Maekawa | ................ | 370/345 |
| 2004/0141490 A1* | 7/2004 | Hong | ................ | 370/345 |
| 2005/0018624 A1* | 1/2005 | Meier | ................ | H04L 29/12028 370/338 |
| 2006/0285528 A1* | 12/2006 | Gao et al. | ................ | 370/338 |
| 2007/0041353 A1* | 2/2007 | Li et al. | ................ | 370/338 |
| 2007/0133448 A1* | 6/2007 | Gao et al. | ................ | 370/311 |
| 2007/0147317 A1* | 6/2007 | Smith | ................ | H04W 48/18 370/338 |
| 2009/0097428 A1* | 4/2009 | Kneckt | ................ | H04W 52/0216 370/311 |
| 2010/0284316 A1 | 11/2010 | Sampathkumar | | |
| 2011/0122804 A1* | 5/2011 | Iyer | ................ | H04L 12/189 370/311 |
| 2011/0286375 A1* | 11/2011 | Chu | ................ | H04W 52/0216 370/311 |
| 2012/0026992 A1 | 2/2012 | Navda | | |
| 2013/0114488 A1* | 5/2013 | Fang et al. | ................ | 370/311 |
| 2013/0235773 A1* | 9/2013 | Wang et al. | ................ | 370/311 |
| 2013/0250832 A1* | 9/2013 | Kim et al. | ................ | 370/311 |
| 2013/0250833 A1* | 9/2013 | Kim et al. | ................ | 370/311 |
| 2013/0286909 A1* | 10/2013 | Panneerselvam et al. | ... | 370/311 |
| 2014/0177501 A1* | 6/2014 | Seok et al. | ................ | 370/311 |

OTHER PUBLICATIONS

Kirti Keshav et al., "Energy Efficient scheduling in 4G smart phones for Mobile Hotspot application", 2012 National Conference on Communications (NCC), IEEE, Feb. 3, 2012, pp. 1-5, XP032154928, DOI: 10.1109/NCC.2012.6176904, ISBN: 978-1-4673-0815-1.

* cited by examiner

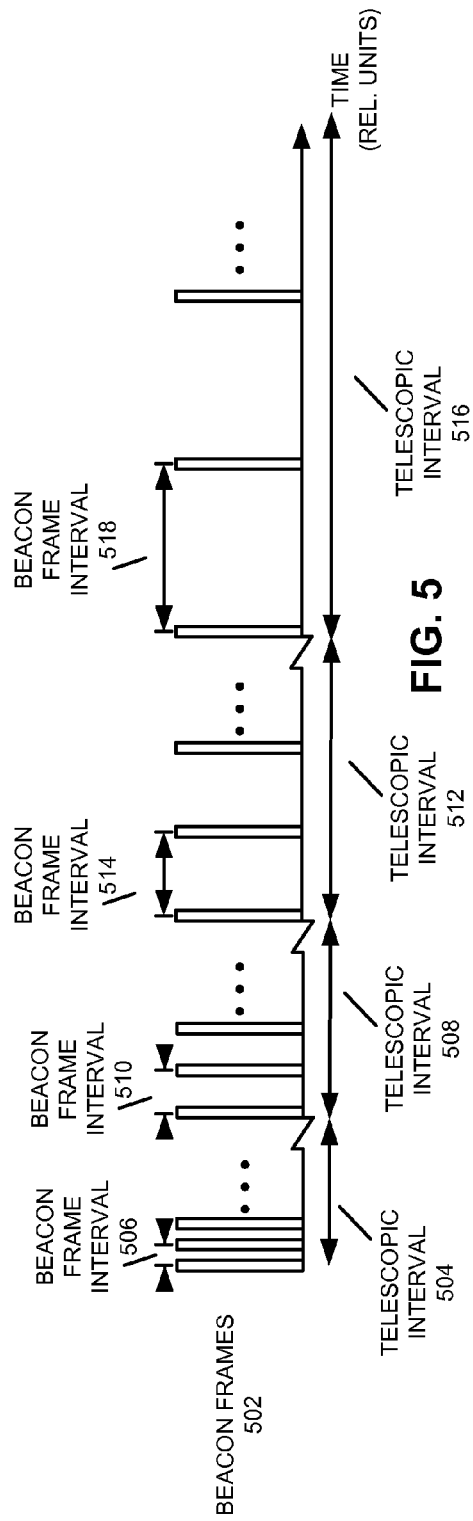
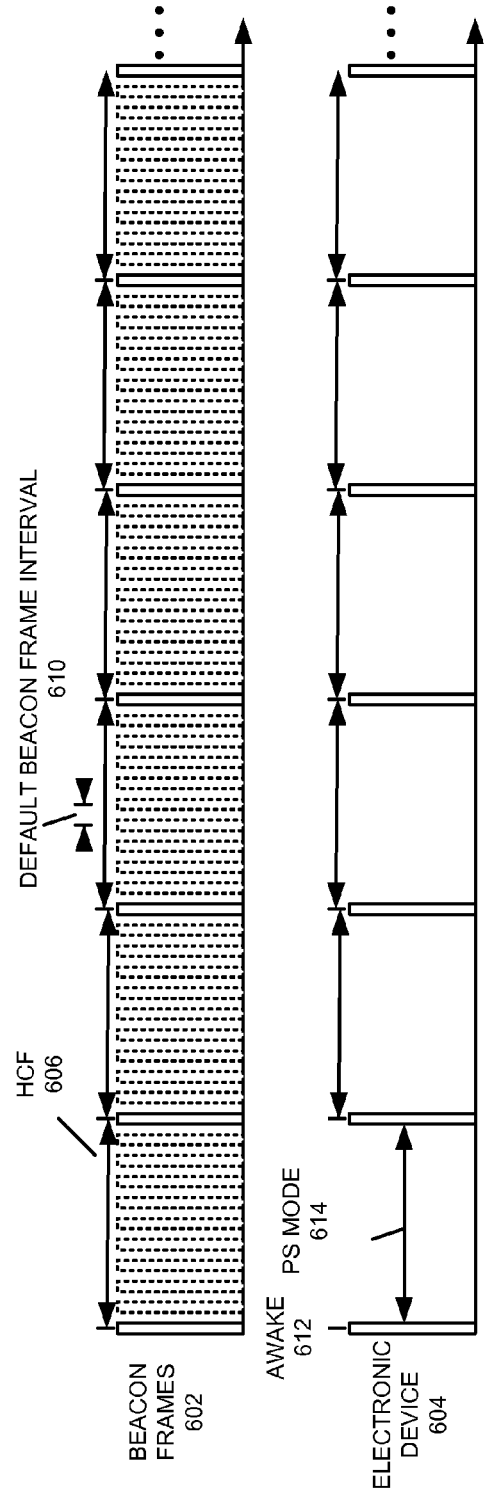

TRANSMITTING BEACON FRAMES OVER A WIRELESS DATA LINK

RELATED APPLICATION

This application hereby claims priority under 35 U.S.C. §119 to U.S. Provisional Application No. 61/697,454, entitled "Transmitting Beacon Frames Over a Wireless Data Link," by Suresh Nagaraj and Songkran Vatanapanpilas, filed 6 Sep. 2012.

BACKGROUND

Field

The described embodiments relate to transmitting beacon frames over a wireless link. More specifically, the described embodiments relate to determining a beacon frame interval for transmitting beacon frames over a wireless data link from an access point.

Related Art

An access point (AP) for a wireless data link (e.g., such as described in the Institute of Electrical and Electronics Engineers (IEEE) standards 802.11) will typically announce it presence by broadcasting beacon frames that contain information about the wireless network that the AP is hosting. The beacon frames are broadcast by the AP at regular intervals called the beacon frame interval. The beacon frame interval is typically set when the AP is configured, and is often set to a value between 100 ms and 2000 ms. The longer the beacon frame interval is, the lower the energy used by the AP, but the increased delay may cause the AP to be less responsive.

When an electronic device (e.g., a smartphone, tablet computer, or laptop) joins the wireless network (i.e., associates with it), the electronic device will inform the AP if the wireless transceiver on the electronic device supports a power save (PS) mode. If a PS mode is supported, the electronic device may reduce its power consumption by entering the PS mode and then exiting it every predetermined number of beacon frames in order to receive data buffered for the electronic device at the AP. Additionally, when the electronic device associates with the AP, the AP will inform the electronic device when it must exit the PS mode in order to receive broadcast or multicast data directed to all of the electronic devices associated with the AP. The AP can continue transmitting beacon frames at the beacon frame interval, even when the associated electronic devices are all in a PS mode.

If the AP is powered by a battery, such as an AP generated by a smartphone or tablet computer, for example a so-called a "personal hotspot," transmitting beacon frames drains energy from the battery. However, increasing the beacon frame interval in order to reduce the number of beacon frames transmitted by the AP may increase the lag of the AP and result in an unacceptable user experience.

BRIEF DESCRIPTION OF THE FIGURES

FIG. 5 presents a timing diagram illustrating a telescopic beacon frame interval in accordance with the described embodiments.

FIG. 6 presents a timing diagram illustrating transmitting beacon frames from an AP with an associated electronic device that support a power save mode in accordance with the described embodiments.

In the figures, like reference numerals refer to the same figure elements.

DETAILED DESCRIPTION

Figure 1:
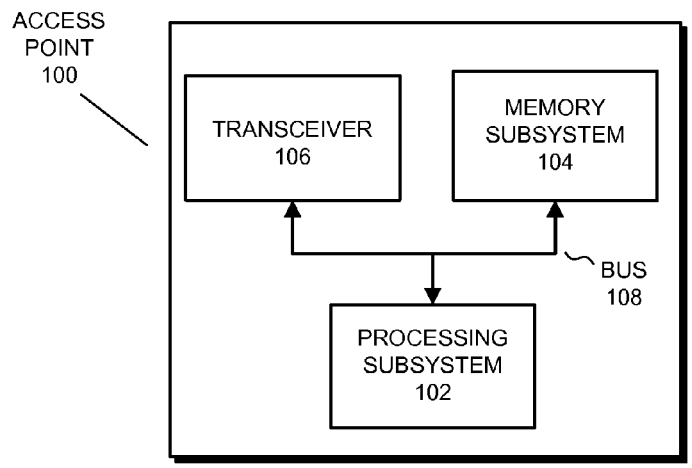
FIG. 1 presents a block diagram illustrating an access point in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In the described embodiments, an electronic device and/or access point with computing capabilities can use code and/or data stored on a computer-readable storage medium to perform some or all of the operations herein described. More specifically, the electronic device and/or access point can read the code and/or data from the computer-readable storage medium and can execute the code and/or use the data when performing the described operations. A computer-readable storage medium can be any device or medium that can store code and/or data for use by such an electronic device and/or access point. For example, the computer-readable storage medium can include, but is not limited to, volatile memory or non-volatile memory, including flash memory, random access memory (RAM, SRAM, DRAM, RDRAM, DDR/DDR2/DDR3 SDRAM, etc.), read-only memory (ROM), magnetic or optical storage mediums (e.g., disk drives, magnetic tape, CDs, DVDs), or other computer-readable mediums capable of storing data structures or code. In the described embodiments, the computer-readable storage medium does not include non-statutory computer-readable storage mediums such as transitory signals.

In the described embodiments, one or more hardware modules can be configured to perform the operations herein described. For example, the hardware modules can comprise, but are not limited to, one or more processors/processor cores, application-specific integrated circuit (ASIC) chips, field-programmable gate arrays (FPGAs), and/or other programmable-logic devices. When such hardware modules are activated, the hardware modules can perform some or all of the described operations. In some embodiments, the hardware modules include one or more general-purpose circuits that are configured by executing instructions (program code, firmware, etc.) to perform the operations.

In the following description, we refer to "some embodiments." Note that "some embodiments" describes a subset of all of the possible embodiments, but does not always specify the same subset of the embodiments.

Overview

The described embodiments perform operations for determining a beacon frame interval for transmitting beacon frames over a wireless data link from an access point (AP). In described embodiments, the AP can include any device with a transceiver that can support a wireless data link and communicate with one or more electronic devices over the wireless data link. The wireless data link may conform to the Institute of Electrical and Electronics Engineers (IEEE) 802.11 standard. Note that the AP may also include or be coupled to an electronic device such as a smartphone, a tablet computer or a laptop computer and may also communicate over a second wireless or wired network which may include the Internet. The second wireless network can comprise cellular networks (e.g., 3G/4G networks such as UMTS, LTE, etc.), networks based on the standards described in Institute for Electrical and Electronic Engineers (IEEE) 802.11, Ethernet networks, wired telephone networks, and/or other types or combinations of types of wired and/or wireless networks. The AP may also include and be powered by a battery; the battery may be any type or configuration of one or more batteries or battery cells implemented in any chemistry and may include one or more rechargeable batteries and/or battery cells.

When an AP is included in a first device such as smartphone, tablet computer or laptop computer, a user may activate the AP (e.g., "personal hotspot") in order to connect to an second electronic device (e.g., another smartphone, tablet computer or laptop computer) so that the second electronic device may connect to a network such as the Internet through the AP in the first device.

When the AP is activated, the AP begins sending beacon frames that announce the presence of the wireless network and include information about the network (as discussed in the IEEE 802.11 standards). The beacon frames are transmitted by the AP at regular intervals called the beacon frame interval. The beacon frame interval is typically set when the AP is configured and is often set to be between 100 ms and 2000 ms.

The AP continues to announce its presence by broadcasting beacon frames at the beacon frame interval. When an electronic device wishes to connect to the AP, the electronic device may begin the process of associating with the AP by transmitting a probe request to the AP. During the process of associating with the AP, the electronic device will inform the AP if the transceiver in the electronic device supports a power save (PS) mode. If the transceiver in the electronic device supports a PS mode, then the electronic device may also inform the AP of its listen interval (LI), usually expressed in units of beacon frame intervals. The LI is the interval over which an electronic device will put its transceiver for the wireless link into a PS mode. The transceiver will exit the PS mode at the end of each LI to receive unicast messages buffered for it at the AP. For example, if an electronic device has a listen interval of 3 and the beacon frame interval is 100 ms, then at the beginning of each LI, the electronic device notifies the AP that its transceiver is entering a PS mode and the AP begins buffering unicast messages for the electronic device. Then, at the end of the LI (300 ms later) the transceiver on the electronic device will exit the PS mode, and if the AP informs the electronic device that there are unicast messages buffered for it at the AP, the electronic device will retrieve the buffered unicast messages and then reenter the PS mode until the end of the next LI. Note that if the transceiver on the electronic device does not support a PS mode or the electronic device does not put its transceiver in a PS mode (e.g., to reduce lag in latency sensitive data) then the AP will transmit unicast messages to the electronic device when they are received, and will not buffer them.

During the association process the AP will inform the electronic device of the delivery traffic indication message (DTIM) interval for the AP. The DTIM interval, usually expressed in units of beacon frame intervals, is the number of beacon frame intervals between DTIMs. A DTIM informs electronic devices associated with the AP whether or not there are broadcast and/or multicast messages buffered at the AP. After the beacon frame that includes a DTIM, the AP will transmit the buffered broadcast/multicast messages, if any. Note that electronic devices with transceivers that support a PS mode may enter PS mode between DTIMs and exit power save mode to receive the DTIM.

In described embodiments, when an AP is first enabled (e.g., a personal hotspot), the AP begins broadcasting its presence by sending out beacon frames at the preconfigured (i.e., default) beacon frame interval (e.g., 100 ms). If no electronic devices are associated with the AP, then the AP can begin transmitting the beacon frames with an increasing (or "telescoping") beacon frame interval. When using a telescoping beacon frame interval, the AP first transmits the beacon frames once each beacon frame interval, and after a predetermined time, the AP can increase the beacon frame interval by a predetermined amount or a predetermined proportion. The beacon frame interval may start at its default value such as 100 ms, and increase until it reaches a maximum interval such as 2000 ms.

For example, when the AP is enabled and no electronic devices are associated, the AP may begin transmitting beacon frames with a beacon frame interval of 100 ms, then after 30 seconds the beacon frame interval can be increased to 200 ms. Then, after 30 more seconds the beacon frame interval can be increased to 400 ms, and then to 1000 ms after 1 more minute, and finally after 5 more minutes the frame interval can be increased to 2000 ms. Note that any number of increases in the beacon frame interval is possible, as well as any time duration at each interval. Using a telescopic beacon frame interval, the AP may reduce the number of beacon frames transmitted and thereby save energy (by e.g., powering up radios and transmitting beacon frames less often). For example, if the AP is a smartphone operating from a battery, the AP may be able to reduce the energy drained from the battery by reducing the number of the beacon frames transmitted by the AP.

When a first electronic device associates with the AP, as discussed above, the electronic device will inform the AP if its transceiver supports a PS mode and its LI, while the AP will inform the electronic device of the DTIM interval for the AP. If the transceiver in electronic device supports a PS mode, then after a predetermined period of inactivity on the wireless data link from the electronic device, the AP will send beacon frames at an interval determined based on a highest common factor (HCF) of the DTIM interval and the LI. For example, if the DTIM interval of the AP is 10 and the LI of the electronic device is 5, then the HCF of the DTIM interval and the LI is 5. Note that the HCF, sometimes also called the greatest common factor or the greatest common divisor can be determined using any process inducing but not limited to Euclid's algorithm.

Note that the AP may use a telescopic beacon frame interval to transition from the default beacon frame interval to the HCF beacon frame interval. When activity is detected from the electronic device (e.g., the electronic device transmits one or more frames to the AP), the AP may resume sending beacon frames at the default beacon frame interval. Then, after a predetermined period of inactivity from the electronic device, the AP may resume sending beacon frames at the HCF beacon frame interval. The predetermined period of inactivity may be determined based on one or more factors including but not limited to the desired energy savings and responsiveness of the AP, and the state of charge of the battery powering the AP.

When a second electronic device associates with the AP, the second electronic device will inform the AP if its transceiver supports a PS mode and its LI, while the AP will inform the second electronic device of the DTIM interval for the AP. If the second electronic device supports a PS mode, then after a predetermined period of inactivity on the wireless data link from the first electronic device and the second electronic device, the AP may send beacon frames at an interval determined based on the highest common factor (HCF) of the DTIM interval, the LI of the first electronic device, and the LI of the second electronic device. For example, if the DTIM interval is 10 and the LI of the first electronic device is 5 and the LI of the second electronic device is 2 then the HCF of the DTIM interval and the LIs of the 2 electronic devices is 2. Note that in some embodiments, the AP may alter the DTIM interval to match the HCF of the one or more LIs of associated electronic devices.

A similar process is followed for each subsequent electronic device that associates with the AP. Note that if an electronic device associates with the AP that does not support a PS mode then the AP can send out beacon frames at the default beacon frame interval.

Access Point

FIG. 1 presents a block diagram illustrating AP 100 in accordance with the described embodiments. AP 100 includes processing subsystem 102, memory subsystem 104, and transceiver 106.

Processing subsystem 102 includes one or more devices configured to perform computational operations. For example, processing subsystem 102 can include one or more microprocessors, application-specific integrated circuits (ASICs), microcontrollers, and/or programmable-logic devices.

Memory subsystem 104 includes one or more devices for storing data and/or instructions for processing subsystem 102 and transceiver 106. For example, memory subsystem 104 can include dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in AP 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by AP 100 as fast-access storage for often-used data, while the mass-storage device is used to store less frequently used data.

Transceiver 106 is a subsystem that includes radios/antennas, processors, controllers, and/or other devices used for coupling to, communicating on, and handling data and events for supporting and communicating on a wireless data link with an electronic device. For example, transceiver 106 can include a networking system based on the standards described in IEEE 802.11, and/or another wireless communication system.

Processing subsystem 102, memory subsystem 104, and transceiver 106 are coupled together using bus 108. Bus 108 is an electrical, optical, or electro-optical connection that the subsystems can use to communicate commands and data among one another. Although only one bus 108 is shown for clarity, different embodiments can include a different number or configuration of electrical, optical, or electro-optical connections between the subsystems.

Although shown as separate subsystems in FIG. 1, in some embodiments, some or all of a given subsystem can be integrated into one or more of the other subsystems in AP 100. Although alternative embodiments can be configured in this way, for clarity we describe the subsystems separately.

AP 100 can be (or can be included in) any device with at least one transceiver. For example, AP 100 can be (or can be included in) a desktop computer, a laptop computer, a server, a media player, an appliance, a subnotebook/netbook, a tablet computer, a cellular phone, a piece of testing equipment, a network appliance, a set-top box, a personal digital assistant (PDA), a smartphone, a toy, a controller, or another device.

Although we use specific subsystems to describe AP 100, in alternative embodiments, different subsystems may be present in AP 100. For example, AP 100 may include one or more additional processing subsystems 102, memory subsystems 104, and/or transceivers 106. Additionally, one or more of the subsystems may not be present in AP 100. Moreover, in some embodiments, AP 100 may include one or more additional subsystems that are not shown in FIG. 1. For example, AP 100 can include, but is not limited to, wired or wireless networking subsystems that can communicate on cellular networks (e.g., 3G/4G networks such as UMTS, LTE, etc.), networks based on the standards described in Institute for Electrical and Electronic Engineers (IEEE) 802.11, Ethernet networks, wired telephone networks, and/or other types or combinations of types of wired and/or wireless networks, including the Internet. AP 100 may also include without limitation, a display subsystem for displaying information on a display, a data collection subsystem, an audio and/or video subsystem, an alarm subsystem, a media processing subsystem, and/or an input/output (I/O) subsystem.

Wireless Data Link Environment

Figure 2:
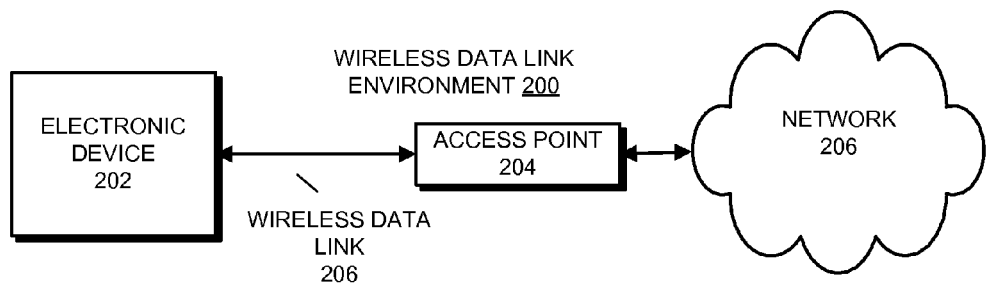
FIG. 2 presents a block diagram illustrating an electronic device coupled through an access point to a network in accordance with the described embodiments.

FIG. 2 presents a block diagram illustrating a wireless data link environment 200 in accordance with the described embodiments. As can be seen in FIG. 2, electronic device 202 is coupled to AP 204 via wireless data link 206, and AP 204 is coupled to network 206. In some embodiments, AP 204 includes the subsystems shown in AP 100. However, AP 204 may comprise different numbers or types of subsystems.

AP 204 is an access point that allows data to be communicated wirelessly with an electronic device and through a wireless data link. Generally, AP 204 can be any type of access point that enables wireless communication of frames (data frames, control frames, etc.) over wireless data link 206 between electronic device 202 and AP 204, and may further allow communication across network 206 as depicted in FIG. 2. For example, AP 204 can comprise a wireless AP that supports a wireless local area network based on the IEEE 802.11 standards and may further connect to network 206 using wired or wireless means.

Network 206 is an electronic communication network. Generally, network 206 can be any type of network that enables electronic, optical, or electro-optical communication of data. For example, network 206 can comprise cellular networks (e.g., 3G/4G networks such as UMTS, LTE, etc.), networks based on the standards described in Institute for Electrical and Electronic Engineers (IEEE) 802.11, Ethernet networks, wired telephone networks, and/or other types or combinations of types of wired and/or wireless networks. In some embodiments, network 206 includes the Internet and/or an intranet.

Although we describe the wireless data link environment shown in FIG. 2 as an example, in alternative embodiments, different numbers or types of devices may be present in wireless data link environment 200.

Operating System

Figure 3:
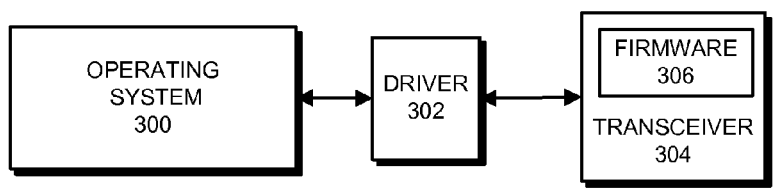
FIG. 3 presents a block diagram illustrating a driver, a transceiver, and an operating system in accordance with the described embodiments.

FIG. 3 presents a block diagram illustrating components of an AP in accordance with the described embodiments. In some embodiments, operating system 300 is stored (as program code) in memory subsystem 104 and executed by processing subsystem 102.

Generally, operating system 300 serves as an intermediary between system hardware in AP 100 (e.g., subsystems 102-106) and instructions executed by processing subsystem 102, such as drive 302. For example, operating system 300 can be, but is not limited to being, the OS X operating system from Apple Inc. of Cupertino, Calif.; the FreeBSD operating system from The FreeBSD Foundation of Boulder, Colo.; or another operating system. Operating systems and their general functions are known in the art and hence are not described in detail.

Operating system 300 provides a low-level abstraction layer for the system hardware in AP 100 that drive 302 can use to access and/or control the system hardware to perform their functions. Additionally, to manage the transfer of data to and from other drivers (not shown) or applications (not shown) in AP 100 (e.g., to communicate over network 206), operating system 300 maintains one or more network protocol stacks (not shown) that each includes a number of logical layers. For example, operating system 300 can maintain an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stacks are known in the art and hence are not described in detail.

Transceiver 304 is controlled by firmware 306 and includes radios/antennas, processors, controllers, and/or other devices used for coupling to, communicating on, and handling data and events for communicating on a wireless data link with an electronic device. Firmware 306 may be preloaded on transceiver 304 and/or dynamically loaded by drive 302, and generally includes data and/or programming used to control transceiver 304. Firmware 306 data and programming may be stored in transceiver 304 on read-only memory (ROM), programmable read-only memory (PROM), and/or erasable programmable read-only memory (EPROM).

Transmitting Beacon Frames

Figure 4:
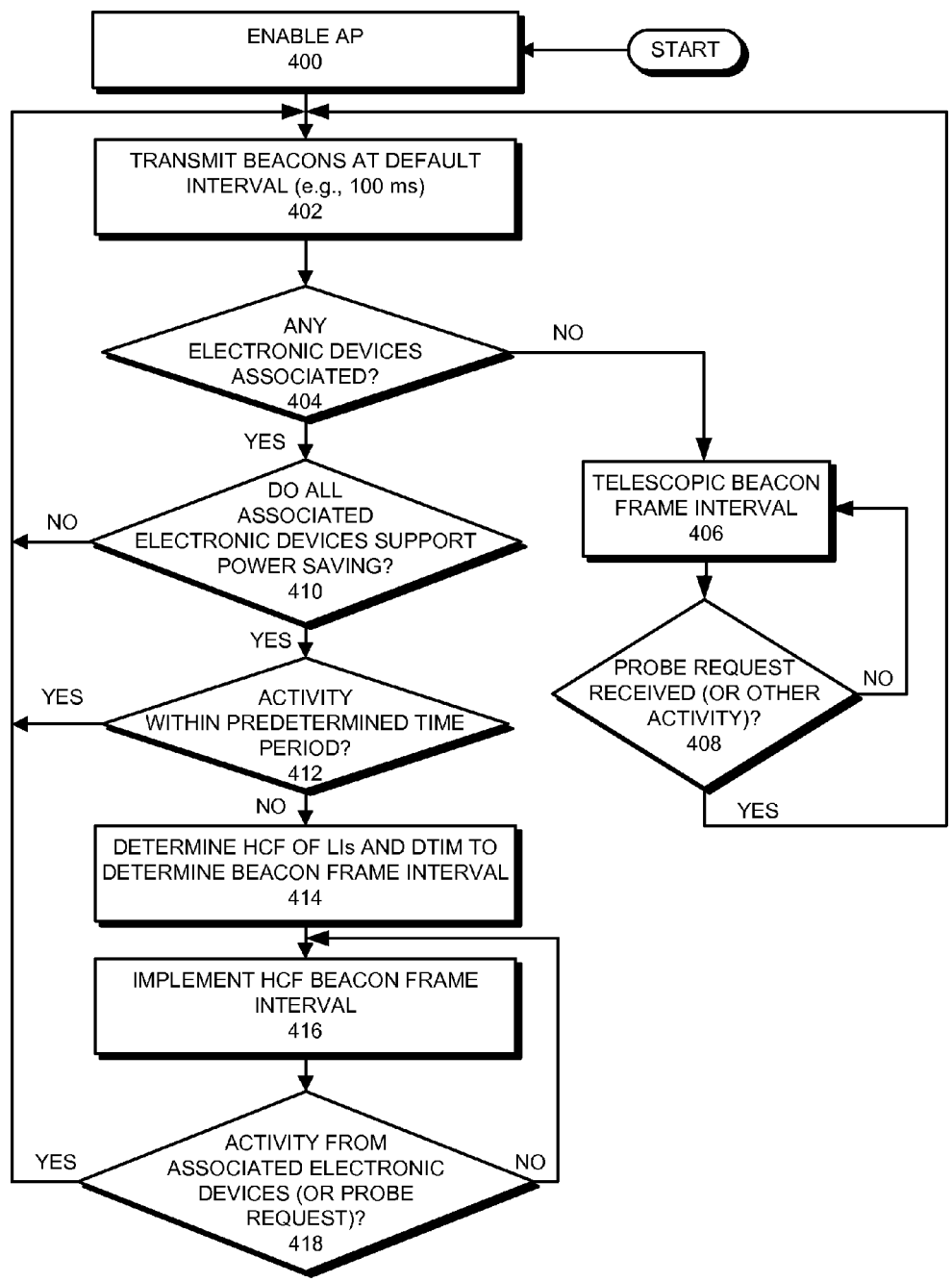
FIG. 4 presents a flowchart illustrating a process for transmitting beacon frames in accordance with the described embodiments.

FIG. 4 presents a flowchart illustrating a process for transmitting beacon frames for a wireless data link in accordance with described embodiments. The operations shown in FIG. 4 are performed by an APs such as AP 204 (which can include subsystems similar to exemplary AP 100). Specifically, operating system 300, drive 302 and transceiver 304 (including firmware 306) perform operations for exchanging data and other information (e.g., LIs, DTIM interval, etc.) necessary to set up and communicate over a wireless data link with one or more electronic devices such as electronic device 202.

The process shown in FIG. 4 starts when AP 204 is enabled in step 400. For example, AP 204 may be included in a smartphone, and is enabled when a user of the smartphone enables the smartphone to create a personal hotspot.

In step 402, firmware 306 controls transceiver 304 to begin sending beacon frames with a default beacon frame interval (e.g., one beacon frame every 100 ms). In step 404, firmware 306 determines if any electronic devices are associated with AP 204. If there are no electronic devices associated with AP 204, then drive 302 controls firmware 306 to send beacon frames using a telescopic beacon frame interval (step 406). (Telescopic beacon frame intervals will be discussed in more detail below with respect to FIG. 5.) During the telescopic beacon frame interval, if a probe request is received or there is other activity on the wireless data link (step 408), the process returns to step 402, while if no probe request or other activity is received (step 408) the process returns to step 406 and continues sending beacon frames using a telescopic beacon frame interval.

FIG. 5 depicts a timing diagram illustrating sending beacon frames using an exemplary telescopic beacon frame interval in accordance with described embodiments. As depicted in FIG. 5, over time, beacon frames 502 are transmitted with an increasing beacon frame interval. Initially, in telescopic interval 504, beacon frames 502 are transmitted at beacon frame interval 506. Beacon frame interval 506 may be selected based on factors including but not limited to energy savings and latency of the AP, and may be any value. Typically beacon frame interval 506 is selected to be the default beacon frame interval and is between 100 ms and 2000 ms. It is often set to 100 ms. Telescopic interval 504 may be any duration and may be selected based on factors including but not limited to energy savings, responsiveness of AP 204, and a state of charge of a battery powering AP 204. Note that as discussed above, once a probe request is received the process returns to step 402.

When telescopic interval 504 ends and telescopic interval 508 begins, the beacon frame interval is increased to beacon frame interval 510. Beacon frame interval 510 may be any interval longer than beacon frame interval 506 and may be selected to be a predetermined duration longer than beacon frame interval 506 (e.g., 150 ms) or a predetermined factor longer (e.g., two times longer). Additionally, telescopic interval 508 may be selected to be any length longer, shorter or the same size as telescopic interval 504, and may be selected based on factors including one or more of those used to selected telescopic interval 504.

When telescopic interval 508 ends, telescopic interval 512 begins and the beacon frame interval is increased to beacon frame interval 514. Beacon frame interval 514 may be any interval longer than beacon frame interval 510 and may also be selected to be a predetermined duration longer than beacon frame interval 510 (e.g., 250 ms) or a predetermined factor longer (e.g., 2.5 times longer). Additionally, telescopic interval 512 may be selected to be any length longer, shorter or the same size as telescopic interval 508, and may be selected based on factors including one or more of those used to selected telescopic interval 508.

Lastly, when telescopic interval 512 ends, telescopic interval 516 begins and the beacon frame interval is increased to beacon frame interval 518. Beacon frame interval 518 may be any interval longer than beacon frame interval 514 and may also be selected to be a predetermined duration longer than beacon frame interval 512 (e.g., 500 ms) or a predetermined factor longer (e.g., 5 times longer). Telescopic beacon frame interval 516 may continue until AP 204 shuts down or is otherwise controlled to stop transmitting beacon frames. Note that although four telescopic intervals are depicted in the embodiment of FIG. 5, other embodiments may use any number of two or more telescopic intervals, and any set of beacon frame intervals. For example, the progression of beacon frame intervals may include one or more of the following intervals: 100 ms, 200 ms, 400 ms, 500 ms, 800 ms, 1000 ms, 2000 ms.

Referring back to FIG. 4, at step 408 if a probe request or other activity is received by AP 204 then the process returns to step 402 and AP 204 starts transmitting the beacon frames at the default beacon frame interval. Then, at step 404 if an electronic device has associated with AP 204, the process continues to step 410. At step 410, AP 204 determines if all electronic devices associated with AP 204 support a PS mode. Note that typically, when an electronic device associates with an AP, the electronic device indicates to the AP if its transceiver supports a PS mode. If an electronic device associated with the AP does not support a PS mode then the process returns to step 402 and the AP continues to transmit beacon frames at the default beacon frame interval. If all of the electronic devices associated with AP 204 support a PS mode then the process continues to step 412.

At step 412 if there has been activity on the wireless data network within a predetermined time period, then the process returns to step 402 and continues transmitting beacon frames at the default beacon frame interval. Note that the predetermined period may be selected to be any length of time based on parameters inducing but not limited to the desired responsiveness and energy usage of the AP. For example, the predetermined period may be selected based on the remaining energy in a battery powering AP 204. If there has been no activity on the wireless network during the predetermined time, then the process continues to step 414.

At step 414 the HCF of the DTIM interval and the LIs of all of the associated electronic devices is determined. (Note that in some embodiments, the determination of the HCF (step 414) may occur before step 412.) Then, at step 416, AP 204 uses the HCF as the beacon frame interval. This is discussed in more detail with respect to FIGS. 6 and 7 below. AP 204 may use a telescopic beacon frame interval to transition from the default beacon frame interval to the HCF beacon frame interval. Then, at step 418 if there is any activity on the wireless data link (e.g., from any of the associated electronic devices or a probe request received from a non-associated electronic device), then the process returns to step 402 and the AP resumes using the default beacon interval. If there is no activity on the wireless data network, then the process returns to step 416.

FIG. 6 presents a timing diagram illustrating transmitting beacon frames 602 using an HCF beacon frame interval from AP 204 with associated electronic device 604 that support a power save mode in accordance with the described embodiments. In the example of FIG. 6, the DTIM interval for AP 204 is 20, the LI for electronic device 604 is 10, and the HCF 606 is 10. As depicted in FIG. 6, when AP 204 transmits beacon frames 602 at HCF 606, beacon frames 602 are separated by 10 default beacon frame intervals 610. Electronic device 604 puts its transceiver in a PS mode 614 between beacon frames and controls the transceiver to exit the PS mode to receive the beacon frames and any data from AP 204. Note that electronic device 604 may control its transceiver to exit the PS mode to transmit data at any time (e.g., during the HCF beacon frame interval) and then return the transceiver to the PS mode.

Figure 7:
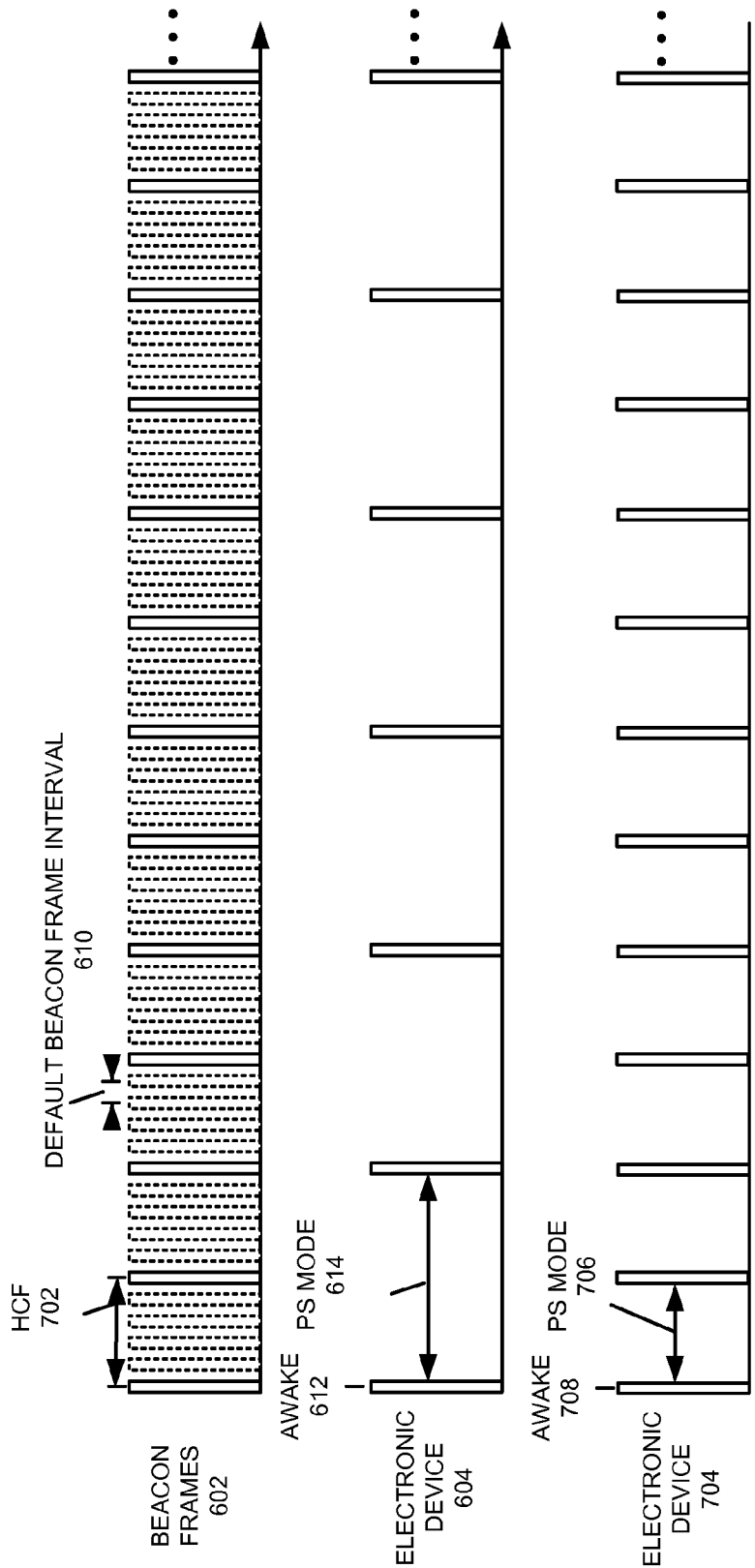
FIG. 7 presents a timing diagram illustrating transmitting beacon frames from an AP with two associated electronic devices that each support a power save mode in accordance with the described embodiments.

FIG. 7 presents a timing diagram illustrating transmitting beacon frames 602 from AP 204 with two associated electronic devices (electronic device 604 and electronic device 704) that both support a power save mode in accordance with the described embodiments. In the example of FIG. 7, the DTIM interval for AP 204 is 20, the LI for electronic device 604 is 10, and the LI for electronic device 704 is 5 so HCF 702 is 5. As depicted in FIG. 7, when AP 204 transmits beacon frames 602, at HCF 702, transmitted beacon frames 602 are separated by 5 default beacon frame intervals 610. Electronic device 604 puts its transceiver in a PS mode 614 between beacon frames for 10 default beacon frame intervals 610 (e.g., the HCF for the DTIM interval and the LI for electronic device 604), and controls its transceiver to exit the PS mode to receive the beacon frames and any data from AP 204. Electronic device 704 puts its transceiver in a PS mode 706 between beacon frames for 5 default beacon frame intervals 610 (e.g., the HCF for the DTIM interval and the LI for electronic device 704), and controls its transceiver to exit the PS mode to receive the beacon frames and any data from AP 204. Note that electronic device 604 and electronic device 704 may each control their transceiver to exit the PS mode to transmit data at any time (e.g., during the HCF beacon frame interval) and then return theirs transceiver to the PS mode.

Figure 8:
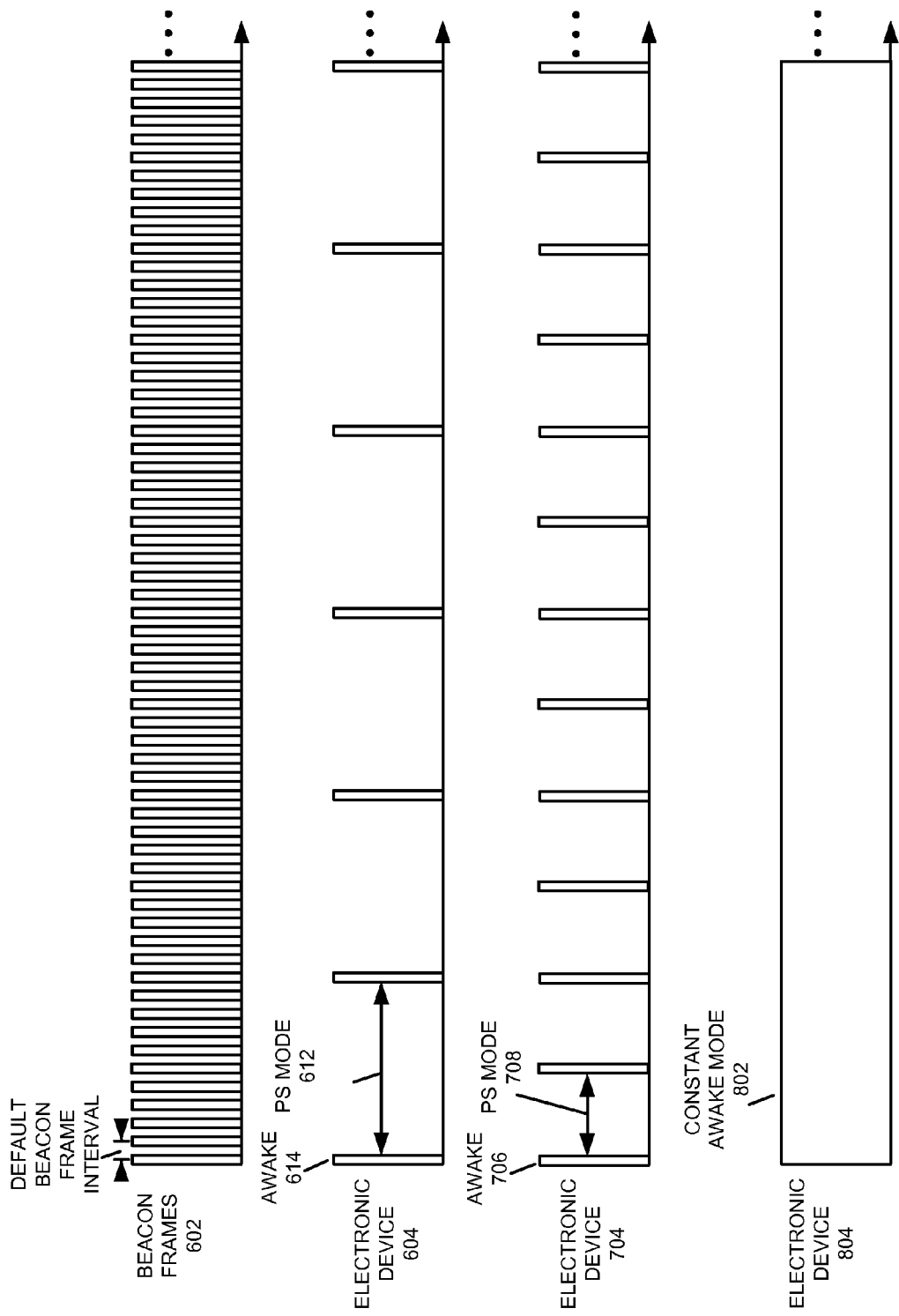
FIG. 8 presents a timing diagram illustrating transmitting beacon frames from an AP with two associated electronic devices that each support a power save mode and one electronic device that does not support a power save mode in accordance with the described embodiments.

FIG. 8 presents a timing diagram illustrating transmitting beacon frames 602 from AP 204 with two associated electronic devices (electronic device 604 and electronic device 704) that each support a PS mode and one electronic device (electronic device 804) that does not support a PS mode in accordance with the described embodiments. In the example of FIG. 8, since one of the electronic devices associated with AP 204 (electronic device 804) does not support a PS mode (e.g., step 410 of FIG. 4), AP 204 continues to transmit beacon frames at the default beacon frame interval. Note that electronic device 804 maintains its transceiver in constant awake mode 802 (i.e., not in a PS mode) and AP 204 sends data it receives for electronic device 804 when it is received, and does not buffer it. However, electronic device 604 and electronic device 704 can continue to put their respective transceivers in a PS mode and exit the PS mode at the DTIM interval and for their respective LIs.

Alternative Embodiments

Although the subsystems of an electronic device are described as an example, in some embodiments, some or all of the above-described functions are implemented using different mechanisms. For example, in some embodiments, one or more separate integrated circuit chips perform the indicated operations. In these embodiments, the integrated circuit chips can include specialized circuits that implement some or all of the above-described operations, and/or can include general-purpose circuits that execute program code (e.g., firmware, etc.) that causes the circuits to perform the operations. In some embodiments, a combination of integrated circuit chips and processing subsystem 102 is used to implement the system.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for transmitting beacon frames for a wireless data link from an access point, comprising:
   prior to receiving a first frame from an electronic device, transmitting beacon frames at a default beacon frame interval;
   receiving, from the electronic device, the first frame and an indication of a listen interval for the electronic device;
   determining a beacon frame interval based at least in part on a highest common factor of the listen interval for the electronic device and a delivery traffic indication message interval for the access point; and
   transmitting beacon frames at the determined beacon frame interval after a predetermined time period has elapsed since receiving the first frame from the electronic device or after the predetermined time period has elapsed since receiving a second frame from the electronic device.

2. The method of claim 1, further comprising:
   in response to receiving the first frame from the electronic device, transmitting beacon frames at the default beacon frame interval for the predetermined time period.

3. The method of claim 1, further comprising:
   receiving a third frame from a second electronic device;
   associating the second electronic device with the access point, wherein the associating comprises receiving a second indication of a listen interval for the second electronic device;
   upon associating the second electronic device, transmitting beacon frames at the default beacon frame interval;
   determining a second beacon frame interval based at least in part on a highest common factor of the listen interval for the electronic device, the listen interval for the second electronic device, and the delivery traffic indication message interval for the access point; and
   transmitting beacon frames at the second beacon frame interval after the predetermined time period has elapsed since receiving the first frame from the electronic device, after the predetermined time period has elapsed since receiving the second frame from the electronic device, or after the predetermined time period has elapsed since receiving a third frame from the second electronic device.

4. The method of claim 1, further comprising:
   associating a second electronic device with the access point, the associating comprising, in response to receiving, from the second electronic device, a second indication that the second electronic device does not support a power save mode, transmitting beacon frames at the default beacon frame interval.

5. The method of claim 1, further comprising:
   prior to receiving, by the access point, the first frame, transmitting beacon frames at the default beacon frame interval for a second predetermined time period; and
   after the second predetermined time period has elapsed, transmitting beacon frames at a second beacon frame interval, wherein the second beacon frame interval is longer than the default beacon frame interval.

6. The method of claim 1, further comprising:
   until the first frame is received from the electronic device, transmitting beacon frames using a telescopic beacon frame interval.

7. The method of claim 1, further comprising:
   determining that the electronic device supports a power save mode.

8. The method of claim 1, wherein the first frame comprises a probe request.

9. The method of claim 1, wherein the second frame comprises a control frame or a data frame.

10. A method for transmitting beacon frames from an access point for a wireless data link, comprising:
    until a frame is received by the access point from an electronic device, transmitting beacon frames at a default beacon frame interval for a first predetermined time period;
    after the first predetermined time period has elapsed, transmitting beacon frames at a second beacon frame interval, wherein the second beacon frame interval is longer than the default beacon frame interval; and
    in response to associating, by the access point, with the electronic device:
    receiving, from the electronic device, a first indication of a listen interval for the electronic device and a second indication that the electronic device supports a power save mode;
    based at least in part on a highest common factor of the listen interval and a delivery traffic indication message interval for the access point, determining a beacon frame interval;
    transmitting beacon frames at the default beacon frame interval during a second predetermined time period; and
    after the second predetermined time period has elapsed since receiving a most recent frame from the electronic device, transmitting beacon frames at the determined beacon frame interval during a third predetermined time period.

11. The method of claim 10, further comprising:
    until the frame is received by the access point from the electronic device, transmitting beacon frames at the second beacon frame interval for a third predetermined time period; and
    after the third predetermined time period has elapsed, transmitting beacon frames at a third beacon frame interval, wherein the third beacon frame interval is longer than the second beacon frame interval.

12. The method of claim 10, further comprising:
    until the frame is received by the access point from the electronic device, transmitting beacon frames using a telescopic beacon frame interval.

13. An apparatus for transmitting beacon frames to an electronic device over a wireless data link, comprising:
    a transceiver;
    a processing subsystem coupled to the transceiver and configured to:
    receive an indication of a listen interval for the electronic device;
    determine a beacon frame interval based at least in part on a highest common factor of the listen interval for the electronic device and a delivery traffic indication message interval for the apparatus; and
    control the transceiver to:
    transmit beacon frames periodically at a default beacon frame interval prior to receiving a frame from the electronic device, and transmit beacon frames periodically at the determined beacon frame interval after a predetermined time period has elapsed since receiving the frame from the electronic device.

14. The apparatus of claim 13, wherein the processing subsystem is further configured to:
receive an indication of a listen interval for a second electronic device;
control the transceiver to transmit beacon frames at the default beacon frame interval; and
after the predetermined time period has elapsed since receiving the frame from the electronic device or receiving a second frame from the second electronic device, control the transceiver to transmit beacon frames at a second beacon frame interval,
wherein the second beacon frame interval is determined by the processing subsystem based at least in part on a highest common factor of the listen interval for the electronic device, the listen interval for the second electronic device, and the delivery traffic indication message interval for the apparatus.

15. The apparatus of claim 13, wherein the processing subsystem is further configured to:
receive an indication of a listen interval for a third electronic device;
determine a third beacon frame interval based at least in part on a highest common factor of the listen interval for the electronic device, the listen interval for the third electronic device, and the delivery traffic indication message interval; and
after the predetermined time period has elapsed since receiving a frame, control the transceiver to transmit beacon frames at the third beacon frame interval.

16. The apparatus of claim 13, wherein the listen interval is expressed in units of a current beacon frame interval.

17. The apparatus of claim 13, wherein the frame comprises a control frame or a data frame.

18. A non-transitory computer-readable storage medium containing instructions that, when executed by a processing subsystem in an access point, cause the access point to perform operations for transmitting beacon frames for a wireless data link from the access point, the operations comprising:
prior to receiving, by the access point, a first frame from an electronic device, transmitting beacon frames at a default beacon frame interval;
receiving the first frame and an indication of a listen interval for the electronic device;
determining a beacon frame interval based at least in part on a highest common factor of the listen interval for the electronic device and a delivery traffic indication message interval for the access point; and
transmitting beacon frames at the determined beacon frame interval after a predetermined time period has elapsed since receiving the first frame from the electronic device or after the predetermined time period has elapsed since receiving a second frame from the electronic device.

19. The non-transitory computer-readable storage medium of claim 18, the operations further comprising:
in response to receiving the first frame from the electronic device, transmitting beacon frames at the default beacon frame interval for the predetermined time period.

20. The non-transitory computer-readable storage medium of claim 18, the operations further comprising:
associating a second electronic device with the access point, wherein the associating comprises receiving, from the second electronic device, an indication that the second electronic device supports a power save mode;
receiving a listen interval for the second electronic device;
upon associating the second electronic device, transmitting beacon frames at the default beacon frame interval;
determining a second beacon frame interval based at least in part on a highest common factor of the listen interval for the electronic device, the listen interval for the second electronic device, and the delivery traffic indication message interval for the access point; and
transmitting beacon frames at the second beacon frame interval after the predetermined time period has elapsed since receiving the first frame from the electronic device, after the predetermined time period has elapsed since receiving the second frame from the electronic device, or after the predetermined time period has elapsed since receiving a third frame from the second electronic device.

21. The non-transitory computer-readable storage medium of claim 18, the operations further comprising:
until the first frame is received by the access point from the electronic device, transmitting beacon frames using a telescopic beacon frame interval, wherein the telescopic beacon frame interval does not exceed a predetermined maximum interval.

22. A system for transmitting beacon frames to an electronic device over a wireless data link, comprising:
a display and touch screen;
a graphics processing unit (GPU) coupled to the display and touch screen; a transceiver;
a processing subsystem coupled to the transceiver; and
a battery coupled to and powering the display and touch screen, the GPU, the transceiver, and the processing subsystem, wherein the processing subsystem is configured to:
receive an indication of a listen interval for the electronic device;
determine a beacon frame interval based at least in part on a highest common factor of the listen interval for the electronic device and a delivery traffic indication message interval for the system; and
control the transceiver to:
periodically transmit a beacon frame at each default beacon frame interval prior to receive a frame from the electronic device, and
after a predetermined time period has elapsed since receiving the frame from the electronic device, transmit beacon frames periodically at the determined beacon frame interval.

23. The system of claim 22, wherein the processing subsystem is further configured to:
control, until the frame is received from the electronic device, the transceiver to transmit beacon frames using a telescopic beacon frame interval;
control, upon receiving an indication that a second electronic device supports a power save mode and receiving a listen interval for the second electronic device, the transceiver to transmit beacon frames at a default beacon frame interval for the predetermined time period; and
control the transceiver to transmit beacon frames at a second beacon frame interval after the predetermined time period has elapsed since receiving the frame from the electronic device or after the predetermined time period has elapsed since receiving a second frame from the second electronic device, wherein the second beacon frame interval is determined by the processing subsystem based at least in part on a highest common factor of the listen interval for the electronic device, the listen interval for the second electronic device, and the delivery traffic indication message interval.

24. The system of claim 22, wherein the system is one of a smartphone, a tablet computer, or a laptop computer.

25. The system of claim 22, wherein the determined beacon frame interval is longer than the default beacon frame interval.

\* \* \* \* \*